Patented Dec. 29, 1931

1,838,523

UNITED STATES PATENT OFFICE

ERNEST GEORGE BECKETT AND JOHN THOMAS, OF CARLISLE, ENGLAND, ASSIGNORS TO SCOTTISH DYES, LIMITED, OF CARLISLE, ENGLAND

PRODUCTION OF ANTHRAQUINONE DERIVATIVES

No Drawing. Application filed July 28, 1924, Serial No. 728,768, and in Great Britain September 3, 1923.

The invention relates to the production of anthraquinone derivatives using as a starting point 1-phthalimido-anthraquinone (see United States Patent No. 1,528,470) and has for its object to provide intermediates and dyestuffs for dyeing, for example, cellulose acetate silk.

The invention consists in the nitration of 1-phthalimido-anthraquinone either by means of nitric acid itself or by means for producing nitric acid and includes the hydrolysis of the nitrated body and subsequent reduction of the hydrolysed body, whereby dyes or dye intermediates can be obtained which may, for instance, be acylated, for example by benzoylation.

The following examples illustrate methods of carrying the invention into effect:—

Example 1

50 parts (all parts herein being parts by weight) of 1-phthalimido-anthraquinone are dissolved in 500 parts of 97 per cent sulphuric acid at 10° C. Into this solution is run a mixture of 100 parts of 80 per cent nitric acid and 100 parts of 97 per cent sulphuric acid and the temperature is kept between 15° C. and 20° C. After being kept for 1 to 2 hours at 15° C. to 20° C. the melt is poured into water, filtered and washed thoroughly with water. The yield of crude nitrated product is 61–62 parts.

The most probable structural formula of the nitro derivative is as follows, the position of the two nitro groups at the moment being uncertain.

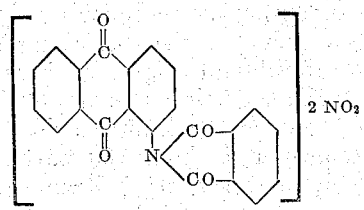

Example 2

According to this example the product prepared by the process of Example 1 is hydrolyzed, for instance by treatment with sulphuric acid; thus 50 parts of the crude product are dissolved in 500 parts of 97 per cent. sulphuric acid, and this is diluted to 85 per cent acid by adding water and keeping the mixture cool below 30° C. The whole is then heated to 85° C. for one hour and poured into 2000 parts of water, boiled and filtered hot, washed well with water and then dried. The yield of crude hydrolyzed body is about 34 parts.

The product of hydrolysis has the probable structural formula as shown below, the position of the nitro groups being undetermined.

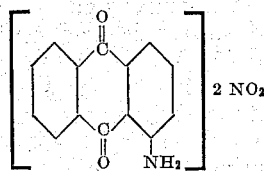

Example 3

This deals with the purification of the crude product prepared by Example 2 and consists in re-crystallization, for example, from a nitrobenzene solution by dissolving the hydrolyzed body in about 4 times its weight of nitrobenzene.

Example 4

This deals with the reduction of the product of Example 3.

According to this example the product resulting from the process of Example 3 is reduced by treatment with sodium sulphide, for example, 10 parts of the purified dinitro-1-amido-anthraquinone are ground up with 150 parts water into a fine paste, which is then poured into 300 parts of water containing 64 parts of sodium sulphide crystals and 7 parts caustic soda, and the whole heated to 80° C. for one hour. The yield is 7 to 8 parts of the reduced anthraquinone derivative, which dyes cellulose acetate deep purple shades from a water suspension.

While the position of the amino groups is uncertain, we regard the most probable structural formula for the reduction product to be as follows,

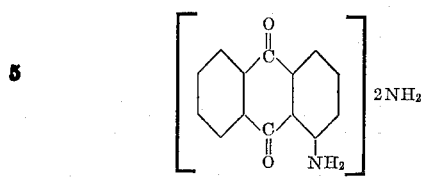

Example 5

This deals with the benzoylation of the product of Example 4.

We have found that the product prepared by Example 4 can be readily benzoylated by well-known methods; for example 3 parts of the reduction product are dissolved in 20 parts of boiling light pyridine and 10 parts of benzoyl chloride added slowly to the boiling solution. The melt is then allowed to cool, filtered and washed with benzene and alcohol and dried. The yield is 5.65 parts of a benzoylated product which dissolves in an alkaline hydrosulphite vat and dyes cotton bluish-red shades of excellent fastness to washing and bleaching and to light.

Example 6

This deals with a modified method of Example 1.

A jacketing stirring pan is charged with 450 parts of sulphuric acid of 93 per cent strength and 450 parts of 20 per cent oleum. After cooling to 20° C. there is stirred into this 112 parts of dry sodium nitrate and the contents are well stirred. When all is dissolved the mixture is cooled to 18° C. and there is added as quickly as possible 100 parts of 1-phthalimido-anthraquinone (see United States Patent No. 1,528,470), the temperature during the addition being kept between 19° C. and 20° C. Stirring is continued for 1½ to 2 hours and the whole mixture is then poured into 9000 parts of water, filtered, washed free from acid and dried. The yield is about 125 parts of a buff-coloured powder.

Example 7

This is a modified method of Example 2.

100 parts of the product of Example 1 are dissolved in 1000 parts of sulphuric acid of 96 per cent strength, the temperature meanwhile being kept below 40° C. and the contents of the pan well stirred. Water is then added until the acid is diluted to 85 per cent. and the temperature is raised to 85° C. and kept at this temperature for one hour. It is then cooled and poured into 10,000 parts of water and washed free from acid. It is preferable to keep the material in a paste form if it is to be used in the process of Example 4. The yield is 70 parts of a reddish-coloured product which can be re-crystallized from nitrobenzene. It melts above 300° C.

Example 8

This deals with a modified method of Example 4.

100 parts of the product of Example 2 in the form of paste are added to 750 parts of water in an iron stirring vessel and made into a paste. A further 2000 parts of water are then added and while the contents are being stirred there is added a solution of 73 parts of caustic soda and 600 parts of sodium sulphide crystals. The temperature is raised to 80° C. and kept at this temperature for one hour. It is then cooled to 50° C. filtered, washed well with water and dried. The yield is about 83 parts of crude reduced anthraquinone derivative which dissolves readily in four times its weight of hot nitrobenzene, from which it separates in small crystals possessing a beautiful bronze lustre, melting at 258 to 260° C. In strong sulphuric acid it dissolves, giving a slightly yellow-coloured solution which turns a bright cherry red on warming in the presence of boric acid. Nitrogen determination on the re-crystallized sample showed 16.2 per cent of nitrogen as against the theoretical of 15.96 per cent for triamido-anthraquinone.

Example 9

This deals with a modified method of Example 5.

50 parts of the dry product of Example 4 or 8 are suspended in 280 parts of nitrobenzene and the temperature raised to 175° C. 98 parts of benzoyl chloride are then slowly added, keeping the temperature at 175° C. After all the benzoyl chloride is added heating is continued for a further 30 minues at 175° C., after which the mixture is allowed to cool to 20° C., filtered and washed with nitrobenzene. The cake is either dried in a vacuum or the nitrobenzene is removed by steam distillation. The material which separates in dark reddish-purple crystals with copper reflux melts above 300° C. and dissolves with a greenish-yellow solution in strong sulphuric acid. The addition of boric acid causes no change in the colour of the sulphuric acid solution, but on warming for a short time a cherry red colouration appears.

What we claim is,

1. In the process of preparing dyestuffs, the steps which comprise dissolving 50 parts of 1-phthalimido-anthraquinone in 500 parts of 97% sulphuric acid at about 10° C., adding about 100 parts of nitric acid of about 80% strength and about 100 parts of sulphuric acid of about 97% strength, maintaining the temperature between about 15° C. and 20° C. for about 1 to about 2 hours pouring the melt into water, separating the liquid from the solid, washing the latter free from acid and drying it.

2. In the process of preparing dyestuffs the steps which comprise dissolving 1-phthalimido-anthraquinone in sulphuric acid of about 97% strength and in amount not less than about 10 times the quantity of 1-phthalimido-anthraquinone, adding nitric acid in amount considerably in excess of that theoretically required and separating the liqiud from the solid thus obtained.

3. A process for the production of dinitro-1-phthalimido-anthraquinone which consists in bringing together 50 parts of 1-phthalimido-anthraquinone sulphuric acid equivalent to about 600 parts of 97% sulphuric acid and nitric acid equivalent to about 100 parts of 80% nitric acid at a temperature of about 15 to 20° C.

4. In the process of preparing dyestuffs the steps which comprise dissolving 1-phthalimido-anthraquinone in sulphuric acid of about 97% strength and in amount not less than about 10 times the quantity of 1-phthalimido-anthraquinone with nitric acid in amount considerably in excess of that theoretically required and separating the liquid from the solid thus obtained.

5. In the process of preparing dyestuffs the step which comprises dissolving 1-phthalimido-anthraquinone in sulphuric acid and nitric acid, the sulphuric acid being in amount not less than about 10 times the quantity of 1-phthalimido-anthraquinone and the nitric acid in amount considerably in excess of that theoretically required.

In testimony whereof we have signed our names to this specification.

ERNEST GEORGE BECKETT.
JOHN THOMAS.